United States Patent [19]

Frost

[11] Patent Number: 5,231,587
[45] Date of Patent: Jul. 27, 1993

[54] COMPUTER CONTROLLED LENS SURFACER

[75] Inventor: Charles E. Frost, Cincinnati, Ohio

[73] Assignee: LOH Optical Machinery, Inc., Germantown, Wis.

[21] Appl. No.: 954,405

[22] Filed: Sep. 29, 1992

Related U.S. Application Data

[63] Continuation of Ser. No. 551,989, Jul. 12, 1990, abandoned.

[51] Int. Cl.⁵ .................... G06F 15/46; B24B 13/00
[52] U.S. Cl. .................... 364/474.06; 51/55; 51/124 L; 51/165.71; 51/165.72; 51/284 R
[58] Field of Search ............. 364/474.06, 473; 51/55, 51/105 LG, 124 L, 165.71, 165.72, 165.77, 284 R; 33/28, 200, 503, 504, 505, 507

[56] References Cited

U.S. PATENT DOCUMENTS

| | | |
|---|---|---|
| 3,900,972 | 8/1975 | Rupp . |
| 4,068,413 | 1/1978 | Suddarth . |
| 4,115,956 | 9/1978 | Huffman ........................ 51/165.71 |
| 4,132,036 | 1/1979 | Doi et al. ........................ 51/124 L |
| 4,264,249 | 4/1981 | Dawson . |
| 4,497,144 | 2/1985 | Kobayashi et al. . |
| 4,535,566 | 8/1985 | Soper . |
| 4,543,749 | 10/1985 | Nakabo . |
| 4,574,527 | 3/1986 | Craxton . |
| 4,603,511 | 8/1986 | Komatsu et al. ............... 364/474.06 |
| 4,633,408 | 12/1986 | Reinmold et al. ............. 364/474.06 |
| 4,653,233 | 3/1987 | Brueck . |
| 4,656,787 | 4/1987 | Ueda et al. . |
| 4,680,998 | 7/1987 | Council, Jr. . |
| 4,760,672 | 8/1988 | Darcangelo et al. . |
| 4,768,308 | 9/1988 | Atkinson, III et al. .......... 51/284 R |
| 4,769,953 | 9/1988 | Jewett, Sr. . |
| 4,829,716 | 5/1989 | Ueda et al. . |
| 4,862,646 | 9/1989 | Briones . |
| 4,928,435 | 5/1990 | Masaki et al. .................. 51/165.71 |
| 4,947,715 | 8/1990 | Council, Jr. .................... 51/124 L |
| 4,980,993 | 1/1991 | Umezaki ......................... 51/165.71 |
| 4,989,316 | 2/1991 | Logan et al. . |
| 5,024,024 | 6/1991 | Watanabe ....................... 51/124 L |
| 5,053,971 | 10/1991 | Wood et al. .................... 364/474.06 |

FOREIGN PATENT DOCUMENTS 0281754 9/1988 European Pat. Off. .
1032541 6/1966 United Kingdom .

OTHER PUBLICATIONS

J. Marioge, 15 J. Optics 183-204 (1984) and partial translation of p. 191.
K. Smith, et al., 21 J. Phys. D./App. Phys. S67-S70 (1988).

Primary Examiner—Joseph Ruggiero
Assistant Examiner—Thomas E. Brown
Attorney, Agent, or Firm—Quarles & Brady

[57] ABSTRACT

There is provided a lens generating apparatus and method for generating a surface on a lens blank, or other workpiece, of a wide range of shapes utilizing rotary movement of the components without a linear way system. The lens generating apparatus includes a rotatable tool support spindle which rotates a spheric tool about a first axis. The tool spindle is directly carried by a high torque, low inertia, direct drive servo motor which rotates the first rotational axis of the spherical tool about a second rotational axis. A workpiece spindle holds the workpiece and rotates it about a third axis which generally lies in the same plane as the first axis. The workpiece spindle is rotatably supported by a second high torque, low inertia, direct drive servo motor which rotates the third rotational axis about a fourth axis. The orientation of the first and third rotational axes are controlled by a CNC computer which controls the rotation of the two direct drive servo motors in dependence upon the rotational orientation of the workpiece. The spherical tool is controlled so as to follow a predetermined three dimensional tool path relative to the lens blank.

3 Claims, 7 Drawing Sheets

COMPUTER CONTROLLED LENS SURFACER

This application is a continuation of application Ser. No. 07/551,989, filed Jul. 12, 1990, abandoned.

TECHNICAL FIELD

The present invention relates generally to lens surfacing apparatuses and is particularly directed to a computer controlled lens surfacing apparatus and method for producing an optical lens from a lens blank. The invention will be specifically disclosed in connection with an apparatus which does not utilize linear way systems, but rather incorporates a system of rotational axes whose relative orientation are controlled by a computer so as to guide the surface generating tool along a predetermined path to generate the desired surface.

BACKGROUND OF THE INVENTION

An opthalmic lens is typically manufactured from a lens blank which has a previously formed spherical surface on a first side. An optic surface is formed on the second side of the lens blank by cutting or grinding the appropriate shape into the blank surface. The exact shape to be cut or ground is determined based on the curvature of the first surface in conjunction with the required prescription. As is well known, for opthalmic lenses the second surface is concaved and may be spherical or toric. A toric lens has two different radii of curvature in planes which are perpendicular to each other The second radius of curvature in a toric lens is generally known as the cylinder correction.

Opthalmic lenses are frequently manufactured from lens blanks made of glass, polycarbonate, or a material known as CR39 TM available from PPG, Industries. CR39 TM and polycarbonate lens blanks may be surfaced by milling or cutting the blank to remove material. Glass, however, may only be surfaced by grinding the blank, typically using a diamond grinding tool.

It is common practice to produce opthalmic lenses using manually-operated grinding machines. With such machines, the lens blank is "blocked", and mounted to a support. A cup-shaped tool typically having a diameter of 3 inches to 4 inches, is mounted to the grinding machine and rotated about its axis as the tool is swept past the stationary lens. The cup-shaped tool may be tilted with respect to the lens so as to approximate the desired radius of the lens in the plane being cut. The tool is usually swept past the lens manually or by a hydraulic feed so as to generate the approximate curve on the lens surface. When the lens blank is made of polycarbonate or CR39 TM the cup-shaped tool may include cutting blades disposed about the lip of the cup so as to form the lens surface by cutting the material from the blank. When a glass blank is used, a cup-shaped grinding tool is utilized having diamonds adhered to the lip of the cup.

The typical lens surfacing machine which utilizes a cup-shaped tool incorporates various linear way systems, frequently in combination with rotational way systems. The combination of rotational way systems and linear way systems is used to tilt the cup-shaped tool out of plane with respect to the lens blank and to sweep the tool past the lens in a predetermined path to form the desired surface.

In order to produce the wide range of radii of curvature as is necessary to be able to form all or most of the desired surfaces, without having to maintain a complete inventory of different cup-shaped tools, one of each possible radius, lens surfacing machines are designed to utilize a limited number of different cup-shaped tools to approximate all of the different radii by tilting the cup-shaped tool out of Plane with respect to the lens blank. In order to achieve the desired tilt and approximate the required radius, linear way systems and rotational way systems are incorporated together in various geometries.

A major problem with lens surfacing machines utilizing tilted cup-shaped tools to approximate the desired radii of the lens is that the desired radius is only approximated, and elliptical error is introduced into the surface. The elliptical error exists as excess material which must be removed in subsequent operations, such as lapping. Lapping requires additional equipment, tooling, time and labor.

In order to reduce the amount of elliptical error created by such lens surfacing machines, way systems have been incorporated in the machines in various arrangements. Precision way systems, typically incorporating precision slides, ballscrews and preloaded nuts, are expensive to manufacture and maintain. They can require time consuming and complex setup and alignment procedures for each lens being generated. This procedure is very labor intensive and requires a relatively high degree of operator skill in order to adjust the equipment and process as necessary to produce precision opthalmic lenses.

During the generation of the lens surface, debris, in the form of dust and chips, is produced when cutting polycarbonate or CR39 TM lens blanks. When glass lens blanks are ground, a cutting fluid must be used to cool and lubricate the lens. The accuracy of way systems can be seriously degraded by the presence of such contamination, including cutting fluids. Way systems are also very difficult to protect directly against such contamination. For these reasons, typical prior art lens surfacing machines incorporate a flexible bellow disposed about the lens blank and the rotating cup-shaped tool to contain all of the cutting debris or cutting fluid used during the surfacing operation. The bellow is attached at either end to the respective non-rotating supports of the tool and the lens blank. Proper installation and operation of the bellow requires additional time to be expended by the operator.

Another drawback to these lens surfacing machines is the time required for changeover, setup and alignment when switching between polycarbonate or CR39 TM lens blanks and glass lens blanks. The difference between the cup-shaped cutting tool for the respective materials is that an additional setup procedure must be followed in order to calibrate the machine to the new tool. Although quick change systems are available, changeover still requires a significant amount of time and effort. Improper setup due to changeover results in errors in the generation of the lens surface.

An alternative to the commonplace cup-shaped tool lens surfacing machines is one in which a spherical, ball nose mill is utilized in conjunction with two precision way systems and a rotating lens blank. In this system, the rotating spherical cutting tool is mounted at an angle on a precision linear way system which moves in a first direction. The lens blank is mounted and rotated about its axis, which is supported by a second linear way system that moves in a second direction which is perpendicular to the movement of the first precision linear way system. A computer controls the displacement of both linear way systems with respect to the rotating lens blank, so as to generate the surface on the lens blank.

This system has all of the drawbacks present with linear way systems of the other lens surfacing systems. It includes the expensive precision slides, ballscrews and preloaded nuts. As mentioned previously, such linear way systems require significant maintenance and lubrication. Setup and alignment can also take significant amounts of time. Additionally, the way system cannot be easily protected against contaminates or the cutting fluid used in grinding glass lens blanks. Such a system can therefore not be easily used to generate surfaces on glass lens blanks.

Thus, there is a need for a lens surfacing apparatus and method which eliminates elliptical error to generate a precision surface which need only be polished to produce an optical finish. There is a need for a system which avoids the drawbacks of precision slides and the associated cost of manufacture, and also avoids the difficulty in protecting such slides. The system needs to include the capability of cutting or grinding all suitable materials, including but not limited to polycarbonate, CR39 TM and glass, while maintaining accuracy and incorporating easy maintenance. The system also needs to be capable of being quickly changed over to handle the various types of materials, such as glass and polycarbonate or CR39 TM. The system should not require any particular skill to operate, and should minimize the cycle time necessary to form the lens surface.

SUMMARY OF THE INVENTION

Accordingly, it is an object of this invention to obviate the above-described problems and shortcomings of lens generating systems heretofore available in the industry.

Accordingly, it is a primary object of the present invention to provide a lens surfacing apparatus and method for generating a surface on a lens blank which is precise and has no elliptical error.

It is another object of the present invention to provide a lens generating apparatus which does not require linear way systems to generate the lens surface.

It is yet another object of the present invention to provide a lens generating apparatus which can be used to generate surfaces on lens blanks made of any suitable material such as polycarbonate, CR39 TM or glass.

It is also an object of the present invention to provide a lens generating apparatus which may be easily and quickly set up to grind glass lens blanks or polycarbonate and CR39 TM lens blanks, and to be changed over quickly between the two groups of types of lens blanks.

Another object of the present invention is to provide a lens generating apparatus which is capable of generating spherical surfaces, toric surfaces, aspherical surfaces or quadric surfaces.

It is another object of the present invention to provide a lens generating apparatus which utilizes spherical cutting or grinding tools.

It is yet another object of the present invention to provide a lens generating apparatus wherein moving precision components are protected against contamination from debris and liquid.

It is also an object of the present invention to provide a lens generating apparatus which can generate precision surfaces in a short cycle time.

Another object of the present invention is to provide a lens generating apparatus which is controlled by a computer, and may be operated by an unskilled technician.

Another object of the present invention is to provide a lens generating apparatus wherein the calibration of the system may be accomplished by a computer control.

It is another object of the present invention to provide a lens generating apparatus which is inexpensive to manufacture and is relatively small in size.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a lens generating apparatus and method for generating a surface on a lens blank, or other workpiece, of a wide range of shapes utilizing rotary movement of the components without a linear way system. The lens generating apparatus includes a rotatable tool support spindle which rotates a spheric tool about a first axis. The tool spindle is directly carried by a high torque, low inertia, direct drive servo motor which rotates the first rotational axis of the spherical tool about a second rotational axis. A workpiece spindle holds the workpiece and rotates it about a third axis which generally lies in the same plane as the first axis. The workpiece spindle is rotatably supported by a second high torque, low inertia, direct drive servo motor which rotates the third rotational axis about a fourth axis. The orientation of the first and third rotational axes are controlled by a CNC computer which controls the rotation of the two direct drive servo motors in dependence upon the rotational orientation of the workpiece. The spherical tool is controlled so as to follow a predetermined three dimensional tool path relative to the lens blank.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
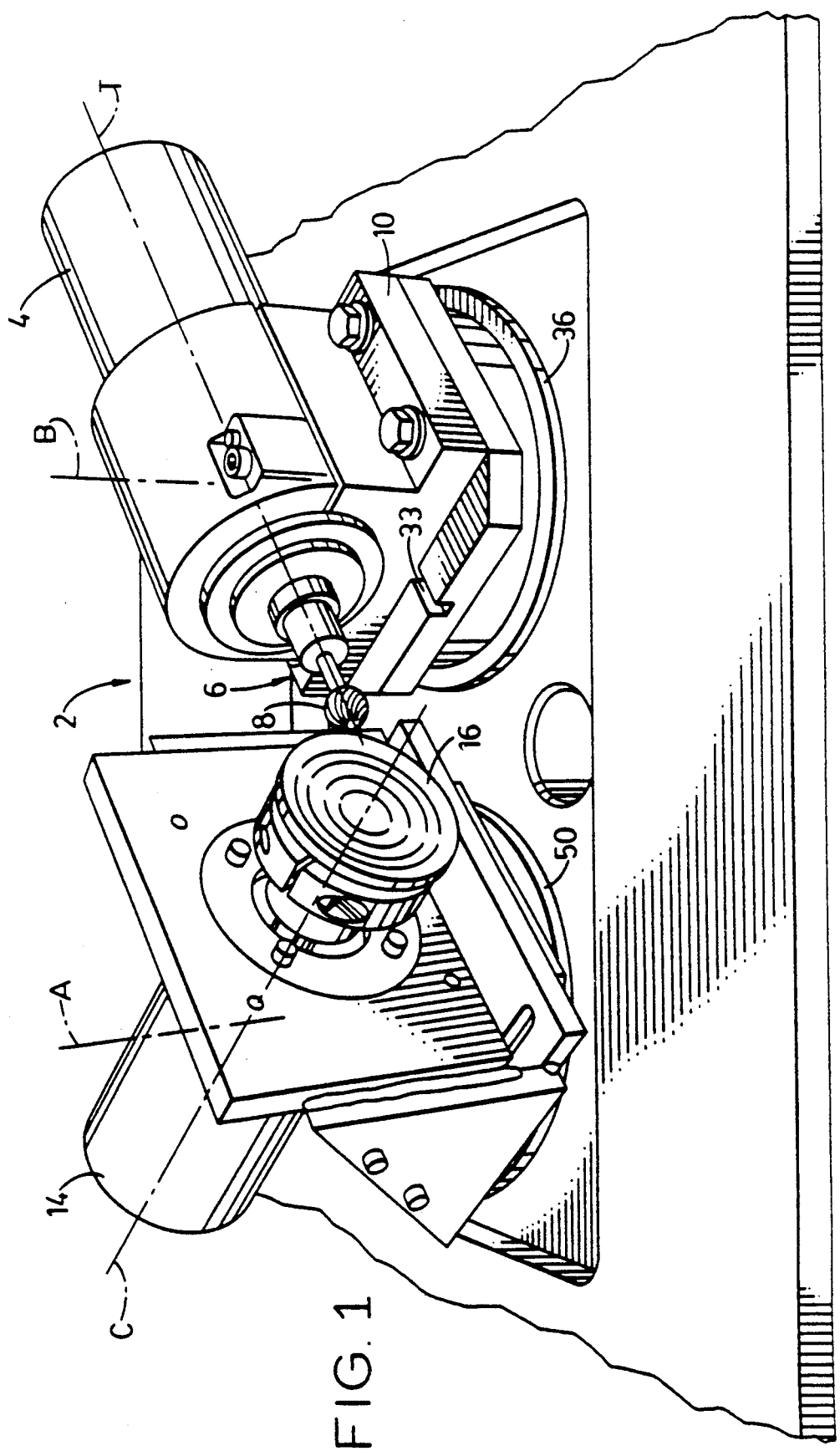
FIG. 1 is a diagrammatic perspective view of a lens generating apparatus constructed in accordance with the present invention.

Referring now to the drawings in detail, wherein like numerals indicate the same elements throughout the views, FIG. 1 is a diagrammatic perspective view of lens generating apparatus generally indicated as 2, constructed in accordance with the present invention. Lens generating apparatus 2 includes tool spindle motor 4 which supports and rotates tool 6, which includes spherical cutting head 8. Tool 6 is rotated by motor 4 about tool rotational axis T which runs longitudinally through tool 6. Axis T is shown in FIG. 1 as being disposed generally horizontal.

Tool spindle motor 4 is carried by tool spindle motor support 10. Motor support 10 is rotatably supported by tool axis direct drive motor 12 to rotate about tool spindle rotational axis B. As shown in FIG. 1, axis B is disposed vertically, and intersects axis T perpendicularly.

Lens generating apparatus 2 also includes workpiece spindle motor 14 which supports and rotates workpiece 16 about workpiece rotational axis C, which runs through workpiece 16. Axis C is shown as being generally horizontal.

Motor 14 is carried by workpiece spindle motor support 18, which is rotatably carried directly by workpiece axis direct drive motor 20. Motor 20 rotates motor 14 and axis C about workpiece spindle rotational axis A. Axis A is shown in FIG. 1 as being parallel to axis B, and as intersecting axis C at a right angle.

Tool spindle motor 4 is a high speed motor which rotates tool 6 at approximately 30,000 RPM. Workpiece spindle motor 14 is a servo motor which rotates workpiece 16 in one direction during generation of the surface. Both motor 12 and motor 20 are direct drive servo motors having high torque and low inertia.

Figure 3:
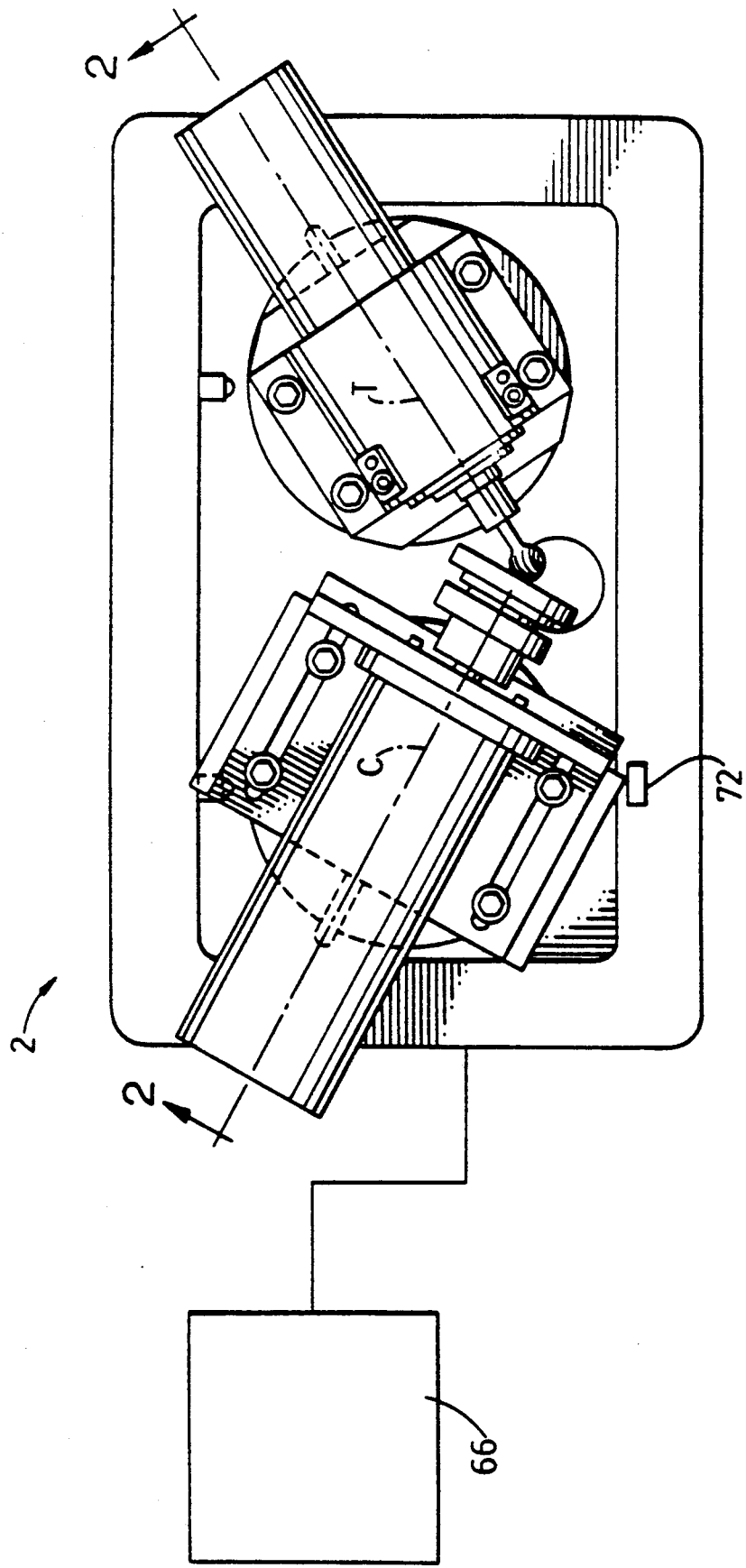
FIG. 3 is a plan view of the lens generating apparatus of FIG. 2, with the tool and lens blank in contact with each other.
Figure 4:
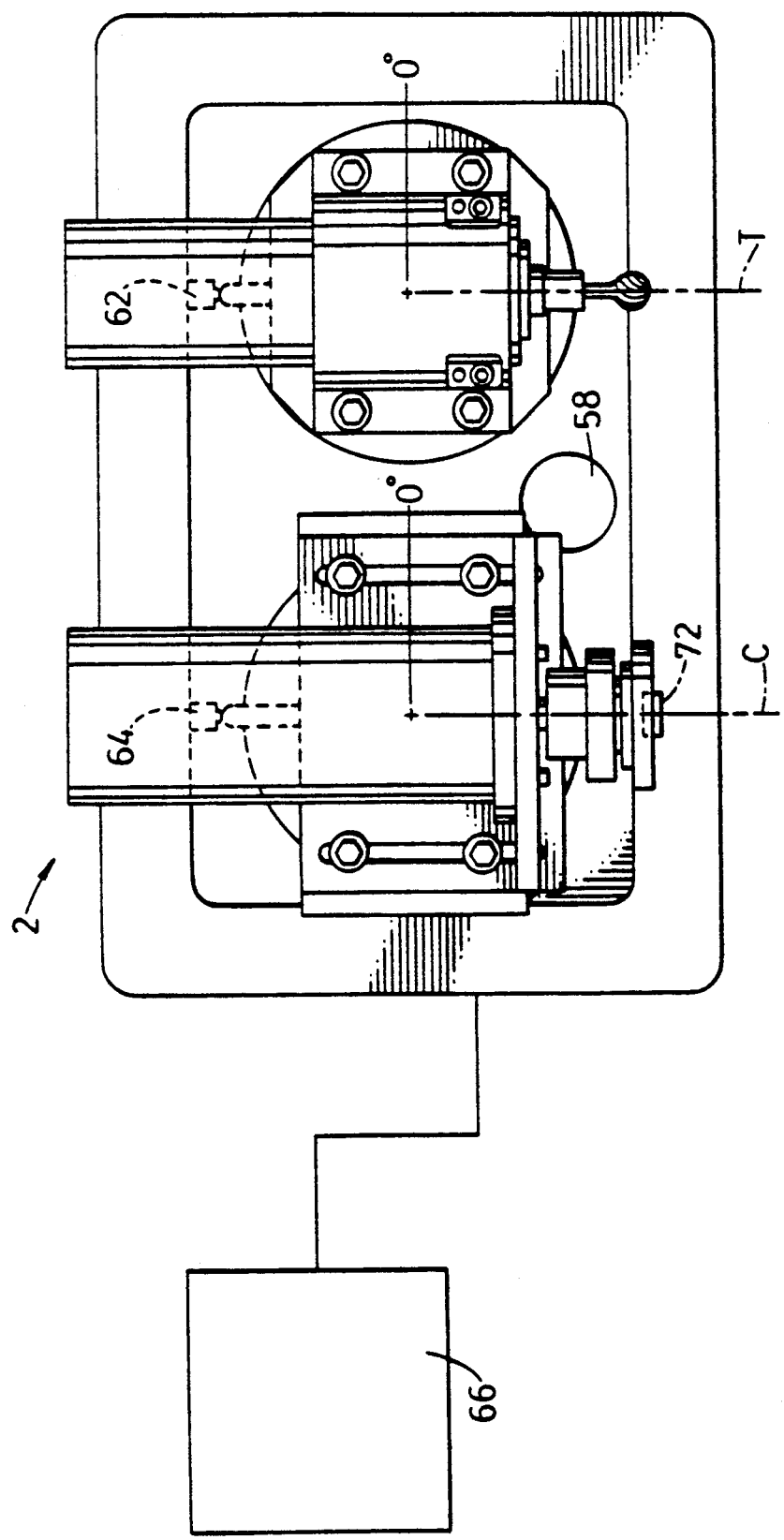
FIG. 4 is a plan view of the lens generating apparatus of FIG. 2, with the tool spindle and the workpiece spindle in the initial position.

Lens generating apparatus 2 is controlled by a CNC type computer 66 (FIGS. 3 and 4). The computer 66 causes spherical cutting head 8 to contact workpiece 16 and follow a three dimensional tool path thereon by controlling the orientation of axis B and axis A with respect to each other, and with respect to the orientation of axis C. By doing so, any mathematically determinable surface, such as spherical, toric, aspherical, or quadric, may be generated by lens generating apparatus 2, subject to the constraints presented by the diameter of cutting head 8 and the relative orientations and locations of the axes of rotation.

Figure 2:
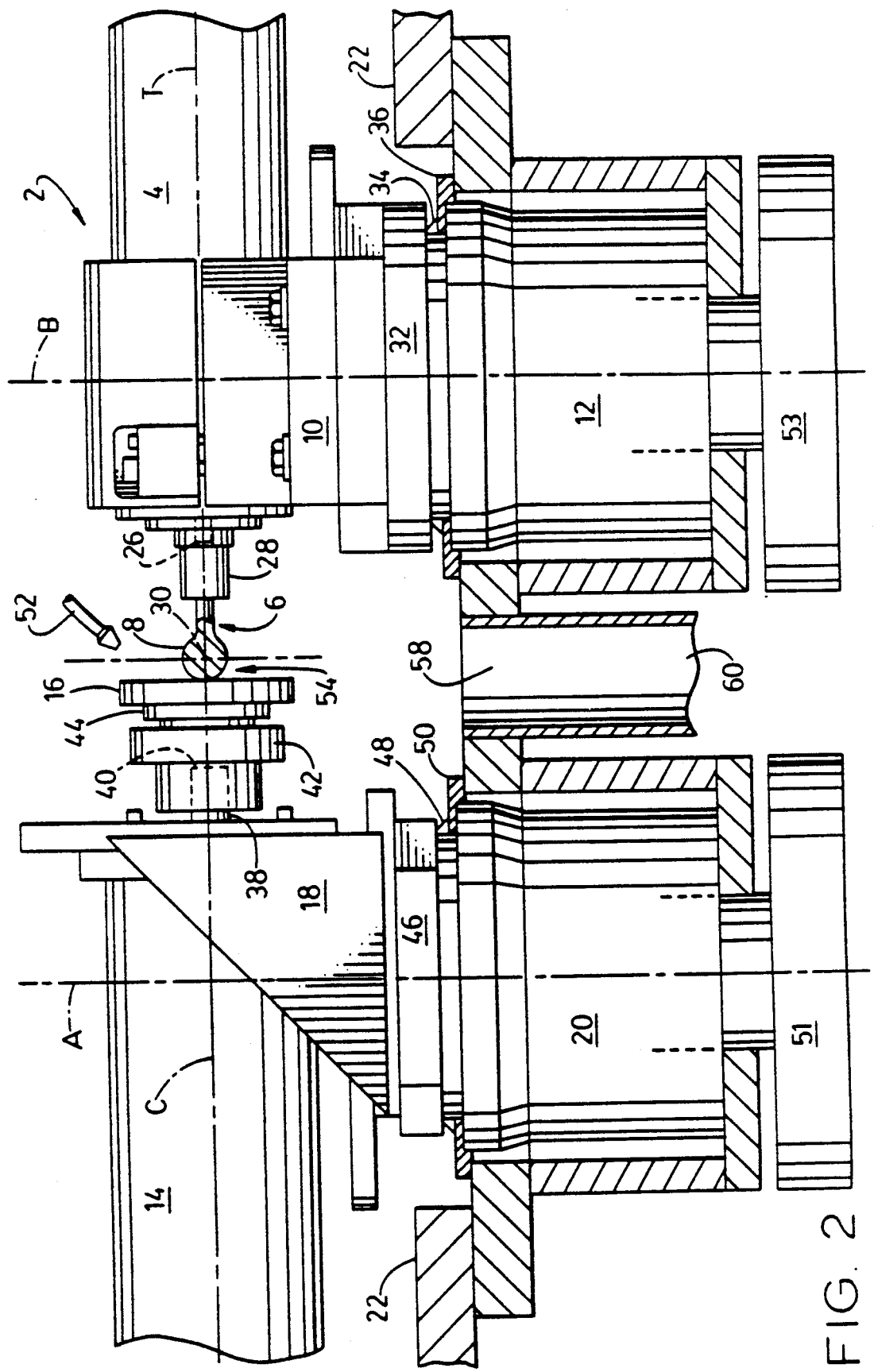
FIG. 2 is a side elevational view of a lens generating apparatus constructed according to the present invention, along line 2—2 of FIG. 3.

FIG. 2 is a side elevational view of lens generating apparatus 2 illustrated in detail. Motors 12 and 20 are mounted to base 22, through motor mounts 12a and 20a, respectively, such that axis A and axis B are parallel to each other and spaced apart approximately 9.5 inches. It is noted that axes A and B are non-coincident with each other. Axis A is shown as intersecting axis C perpendicularly. Similarly, axis B is shown as intersecting axis T perpendicularly.

Axes C and T are shown as lying in the same plane with each other. Although the preferred embodiment incorporates the above described relative positions and orientations of these axes, it is possible to practice my invention with axes which are not perpendicular to each, and which do not intersect each other. For example, axis A and axis B may be skewed with respect to each other. Axis T may be non-perpendicular or skewed with respect to axis B. Similarly, axis C may be non-perpendicular or skewed with respect to axis A. The underlying criteria and limitations on the orientation and location of these four axes is that they be rotatable in concert with each other so as to generate a desired surface on workpieces 16. The computer program which operates lens generating apparatus 2 may easily be adapted to accommodate other orientations of these axes. However, it is believed that the orientation and location of these axes as illustrated herein, particularly in FIGS. 1 through 4, as the most advantageous system with respect to ease and cost of construction and assembly, as well as ease of programming.

Tool spindle motor 4 includes tool spindle 24 which has longitudinal end portion 26. Tool support mounting 28 is connected to longitudinal end portion 26 and adapted to receive and retain tool 6. preferably, tool support mounting 28 includes a quick release mechanism which permits easy and fast changing of tool 6. As will be described below, the tool mounting system is designed to locate the center 30 of any spherical cutting head 8 at a fixed, predetermined distance from axis B. It should be noted that while this distance is preferred to be constant no matter what tool is being utilized, the computer program operating the system may easily be set up to accommodate different dimensions between tool center 30 and axis B.

The speed of rotation of tool 6 is dictated by the type of material being cut, or in the case of glass, being ground. Although the description herein refers specifically to polycarbonate, CR39 ™ and glass, it is to be understood that the present invention is not limited to these specific materials, and any suitable material may be used. In the preferred embodiment, for cutting polycarbonate or CR39 ™ lens blanks, tool 6 is rotated at 30,000 rpm, with an accuracy of plus or minus 25%, i.e., 7,500 rpm. The direction of rotation of tool 6 is dictated solely by the shape of the teeth, as is well known. The horsepower required for spindle motor 4, is dependent upon the cutting requirement of the system. Again, workpiece rotational speed and material composition determine the tool rotational speed based on the desired chip load, i.e., the amount of material removed per tooth of tool 6, subject to the maximum allowable chip load. In the present case, the designed chip load was selected to be 0.001 inches of material removed per tooth. For cutting CR39 ™, a three horsepower tool spindle motor 4 is adequate for operation with tool 6 as described in detail below.

Tool spindle motor 4 is carried by tool spindle support 10. In the preferred embodiment, motor support 10 is a planar type mount which bolts directly to rotatable motor flange 32. The distance between center 30 and axis B may be adjusted using track 33 (FIG. 1). It is noted that such adjustment is not necessary during operation of the invention, but merely allows some flexibility to vary the center distance and to accommodate manufacturing tolerances in apparatus 2. Motor flange 32 is directly driven by direct drive motor 12. Seal 34 is disposed about flange 32 to seal between flange 32 and sealing ring 36. As will be described later, seal 34 prevents debris, such as dust and chips, and cutting fluid from contaminating motor 12.

Motor 20 is mounted to motor mount 20a which is secured to base 22. As previously mentioned, supports workpiece spindle motor 14. Work piece spindle motor 14 is a D001 Delco Fanuc AC servo motor, and includes workpiece support spindle 38. Longitudinal end portion 40 of workpiece support spindle 38 carries lens clamp, or workpiece mounting 42. Block 44 securely carries workpiece 16 by utilizing a low melting point alloy as is well known in the industry. Block 44 is connected to lens clamp 42, which preferably has a quick disconnect design to simplify assembly thereto. Work piece spindle motor 14 is connected to workpiece spindle motor support 18. Support 18 is secured to rotatable motor flange 46 which is connected directly to direct drive motor 20. The position of support 18 relative to Axis A may be adjusted using tacks 47 (FIG. 1). Such adjustment is not required during operation of apparatus 2, but merely provided to allow flexibility and to accommodate manufacturing tolerances in apparatus 2. Seal 48 seals between motor flange 46 and sealing ring 50, serving to prevent debris, such as chips and dust, and cutting fluid from contaminating motor 20.

Both motor 12 and motor 20 are direct drive, high torque low inertia motors. In order for lens generating apparatus 2 to generate a surface in a reasonably short period of time, it is important not only that the rotational positions of axes C and T, and the accompanying physical hardware associated therewith, be accurately controlled, but they must also have a very quick response time. This requires that motors 12 and 20 be able to accelerate and decelerate the loads carried thereby quickly enough to position tool 6 and workpiece 16, respectively, as dictated by the angular position of workpiece 16 about axis C (as will be described in detail below). The response time on motors 12 and 20 is also dictated by the rotational speed of workpiece 16 about axis C.

This need for accuracy and response is best met by direct drive motors. In the preferred embodiment, motors 12 and 20 are NSK BS0608FN001 servo motors, having parallel axes of rotation spaced 9.5 inches apart These motors are high torque low, inertia motors, capable of generating torque in the range of 0 to 20 ft-lb, and having a speed of 0 to 12 rpm. Each motor has an inertia of approximately 10 lb-in$^2$, and are designed to operate with a load inertia to motor inertia in the range of 10:1 to 100:1. In the preferred embodiment, motors 12 and 20 are operated at a load inertia to motor inertia ratio of 50:1, with a load inertia of 500 lb-in$^2$. As is well known, if the inertia of the load is too low, motors 12 and 20 will react faster than the electronic control system can control them. Conversely, if the load inertia is too high, motors 2 and 20 will respond too slowly and lag behind the control system, never reaching the appropriate locations at the appropriate times. Additional inertia weights 51 and 53 may be mounted to be rotated by motors 20 and 12 respectively, concomitantly with supports 18 and 10, respectively, if necessary to achieve the desired load inertia to motor inertia 50:1 ratio. Inertia weights 51 and 53 may be mounted in any convenient manner and location. It is noted that it is desirable for both motor 12 and motor 20 to have nearly the same response time and accuracy. In the event that motor 12 is not identical to motor 20, the load inertia to motor inertia for each motor can be adjusted to produce the desired response time and acceleration/deceleration capability.

As previously noted, lens generating apparatus 2 includes seals 34 and 48 which protect motors 12 and 20 from contamination. The rotational motion utilized in generating apparatus 2 greatly simplifies the protection of the system, in contrast to apparatuses which utilize linear way systems. This improved sealing capability permits the grinding of glass workpieces, which requires a continuous flow of cutting fluid from feed tube 52 directly into cutting zone 54. Feed tube 52 is supported in any conventional manner by base 22 or other support, as is well known in the art. Base 22 includes recess 56 which retains cutting fluid and directs it toward drain 58 formed in base 22, underlying cutting zone 54. Drain 58 may also operate as a vacuum port to withdraw chips and dust from cutting zone 54 when polycarbonate or CR39 TM workpieces are being cut without cutting fluid. Tube 60 can double as a drain tube and as a vacuum tube. A shroud (not shown) is preferably located over the entire assembly during cutting or grinding of workpiece 16, both for containment of chips, dust and/or liquid, as well as for general safety.

In order to generate a precision surface on workpiece 16, it is necessary to control accurately the rotational positions and velocity of workpiece 16 about axis C, axis C about axis A, and axis T about axis B. The rotational position of workpiece 16 about axis C is the master parameter which dictates the corresponding angular position of axis T about axis B and the angular position of axis C about axis A.

Workpiece spindle motor 14 controls the angular position and velocity of workpiece 16 about axis C. Motor 14 includes an optical encoder which generates 8000 counts per revolution. The positional accuracy of motor 14 is within one count. Motor 14 also includes one home pulse per revolution.

Direct drive motors 12 and 20 each include a resolver type positional indicator which generates 614,000 counts per revolution. The dynamic positional accuracy of motors 12 and 20 are within 20 counts, due to overshoot in the control loop. Motors 12 and 20 include 150 index pulses per revolution. Respective limit switches 62 and 64 are disposed to generate one reference pulse per rotation of flanges 32 and 46 respectively.

Figure 6:
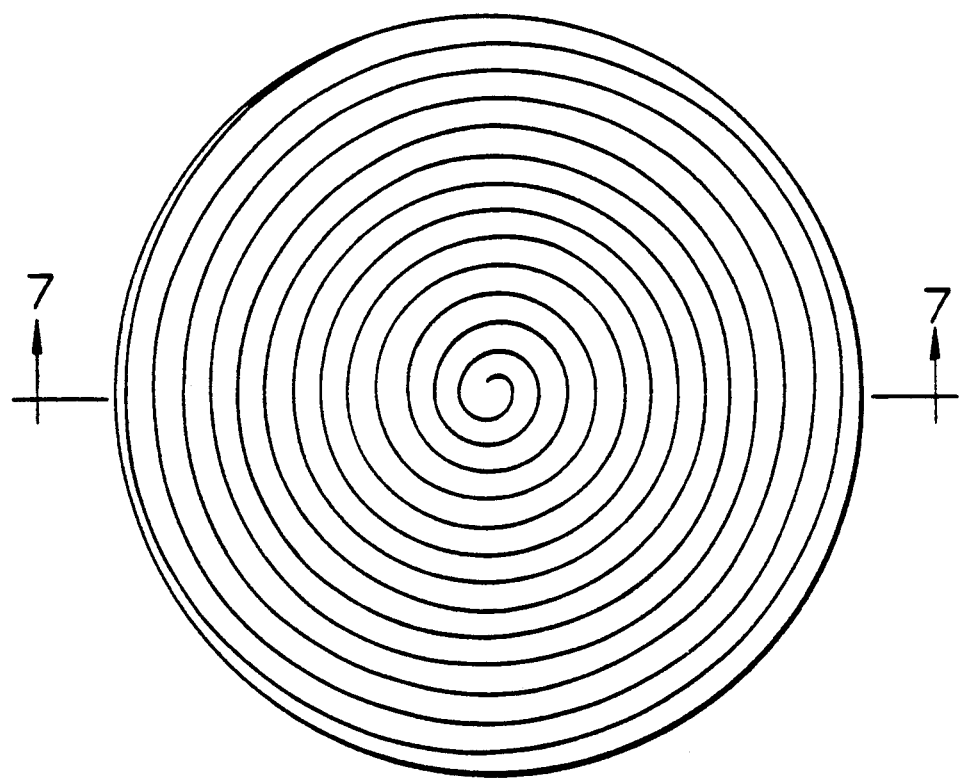
FIG. 6 is an end view of the lens blank showing the tool path according to the present invention.
Figure 7:
FIG. 7 is a side view of the lens blank taken along line 7—7 of FIG. 6.

To generate a particular surface, spherical cutting head 8 is caused to follow a spiral tool path across workpiece 16 as workpiece rotates about axis C. When the surface being generated is curved, as will typically be the case, the tool path of spherical cutting head 8 will follow a three dimensional spiral between the outer edge and the center of workpiece 16, as shown in FIG. 6. The path may begin at the outer edge or at the center of workpiece 16. FIG. 7 illustrates a side view of the actual three dimensional tool path which is followed when generating a toric surface.

In the preferred embodiment, tool 6 rotates in a counterclockwise direction when viewed along axis T in the direction of arrow 65 (FIG. 4). The direction of rotation of tool 6 is dictated by the shape of the teeth on cutting head 8. In the counterclockwise direction presented here, the material being removed is caused to be thrown downwardly, facilitating collection of the debris. Workpiece 16 is rotated clockwise when viewed along axis C in the direction of arrow 67 for workpieces made of CR39 TM and glass, and counterclockwise for workpieces made of polycarbonate. The selection of the direction of rotation of workpiece 16 is based on which direction yields the best results for the given direction of rotation of tool 6.

A toric surface model provides the positioning coordinates for the lens surface. These position coordinates then are translated into position angles by using mathematical formulas for the intersection of two circular arcs. The three dimensional tool path is determined based on the mathematical model of the surface to be generated.

Figure 8:
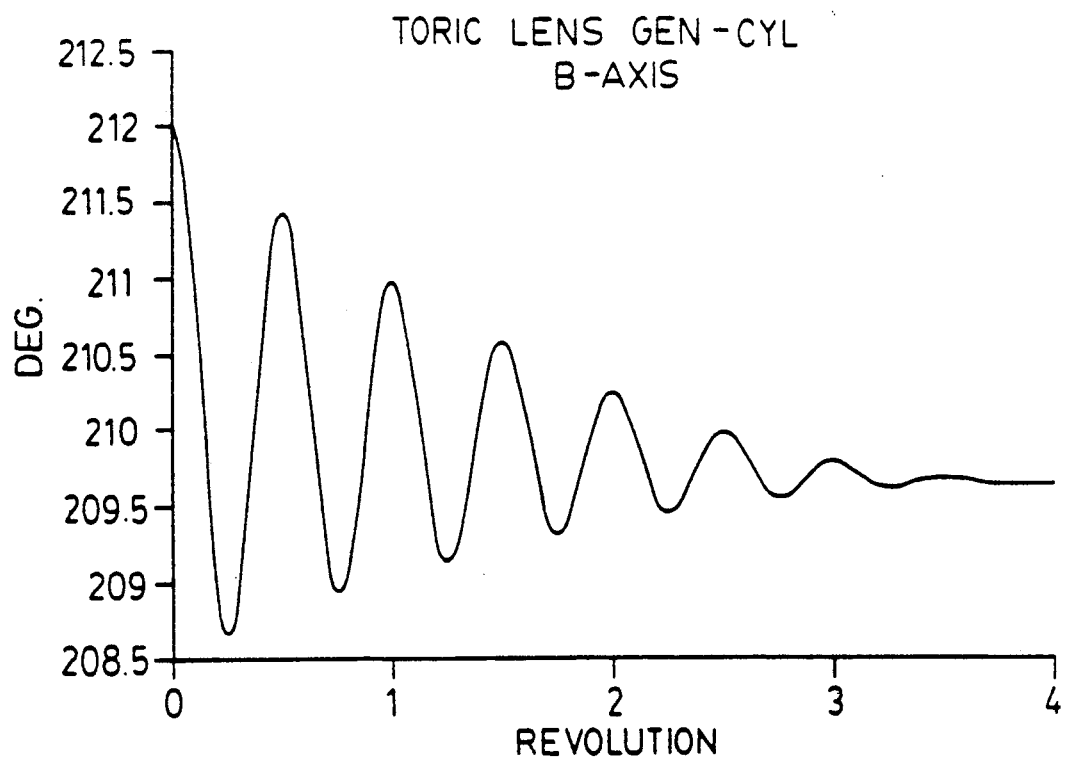
FIG. 8 is a graph showing the angular position of the B axis as a function of the rotation of the lens blank.
Figure 9:
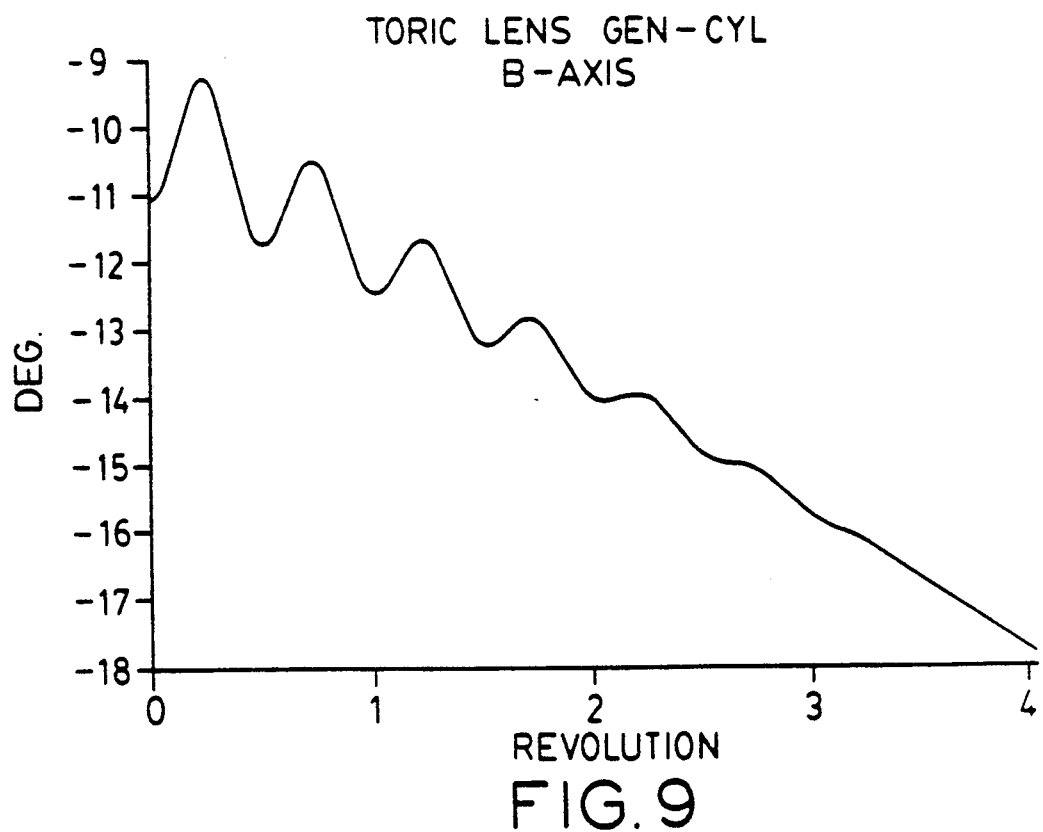
FIG. 9 is a graph showing the angular position of the A axis as a function of the rotation of the lens blank.

In order to follow the necessary tool path, axis T must be rotated by motor 12 about axis B while axis C is simultaneously rotated by motor 20 about axis A. The actual relative position between axis T and axis C is determined as a function of the angular position of workpiece 16 about axis C, for any toric surface. Because the radius of curvature for a toric surface changes four times for each revolution of workpiece 16, the orientation of axes T and C about axis B and A respectively are constantly changing as a function of the angular position of workpiece 16 about axis C. FIGS. 8 and 9 graphically illustrate a simple example of the angular perturbations of axes T and C. In both FIGS. 8 and 9, spherical cutting head 8 takes four revolutions of workpiece 16 about axis C to travel from the outer edge of a three inch diameter lens blank to the center. The angles were measured from the 0° line shown in FIG. 4, with the counter clockwise rotation being the positive angular direction.

The key to accurate generation of a surface on workpiece 16 is the control of the velocity of the C, A and B axes. The C axis velocity is controlled directly within 1%, and the resulting angular positions of workpiece 16 about axis C are used to generate the required angular rotations of axes T and C about axes B and A respectively. In the preferred embodiment, a relational table is created setting forth the velocities and angular positions of axes A and B based on the angular position and velocity of axis C. Using this control algorithm, the angular position of workpiece 16 about axis C is referred to the master, while the resulting angular positions of axes T and C about axes B and A are referred to as slaves. The rotational velocity of workpiece 16 about the C axes is maintained by an open loop control, with rotation being only in one direction. Rotation about axes A and B is bi-directional, and is controlled by a closed loop control algorithm which incorporates a position loop with a feed forward branch.

With the rotation of workpiece 16 about axis C being the "master", the rotational velocity, $\dot{c}$ is determined based on the formula $\dot{c} = f/R$ where R is the radius at which the spherical cutting head is contacting workpiece 16, and f is a multiplying factor which is selected to maintain a desired and constant chip load on cutting head 8. As is well known, if the chip load becomes too low, not enough material will be removed, and the surface will be burned If the chip load is too high, more friction and heat will be generated, which degrade the surface finish, and require more horsepower from tool spindle motor 4. There is a large range of acceptable chip load, and in the preferred embodiment the designed chip load was 0.001 inch of material removed per tooth of cutting head 8. The rotational velocity about the A and B axes is preferably controlled accurately within 4% or less, desirably as low as 0.1%.

In the preferred embodiment, the rotational velocity of workpiece 16 about axis C ranges from 30 rpm at the outer edge of the 3 inch workpiece to 350 rpm at the center when generating a toric surface, and up to 600 rpm at the center when generating a spherical surface. When no cylinder correction is present, i.e., spherical lens, the angular velocity of the workpiece about axis C when spherical cutting head 8 is at the outer edge still begins at 30 rpms, although it could be allowed to begin at a higher rpm.

When there is a significant cylinder correction present, the value of f is set lower so that the rotations of axes T and C about axes B and A respectively may respond accurately. This is because the greater the difference between the two radii of curvature of a toric surface, the greater the acceleration and deceleration necessary for the angular perturbations about the A and B axes. In a fully automated system, the value of f may be calculated for various ranges of differences between the radii of curvature. As will be appreciated, a spherical lens is analogous to a toric lens with both radii being equal, and may be easily generated by apparatus 2. The value of f is also a function of response time for the direct drive motors in relation to the prescription being cut, i.e., the differences between the radii of curvature.

To generate the angular perturbations about axes A and B in dependence upon the angular orientation of velocity of workpiece 16 about axis C, a reference table is generated by the computer control 66 (FIG. 3). During generation of the surface, computer control 66 operates lens generating apparatus 2 in a manner well known for controlling CNC machinery.

Figure 5:
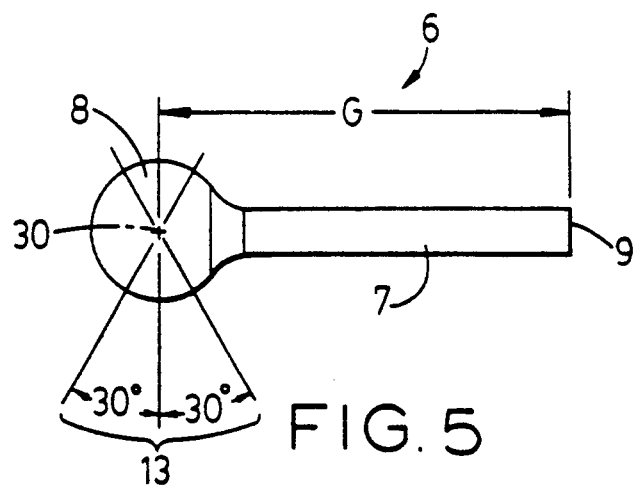
FIG. 5 is a side elevational view of a spherical cutting tool.

Referring now to FIG. 5, tool 6 includes spherical cutting head 8 which is connected to tool shaft 7. Shaft 7 includes a reference surface 9. As shown, reference surface 9 is a distance G from center 30 of head 8. G represents a gauge distance which may be set or controlled by the manufacturer of tool 6, or alternatively set or controlled at a central tool crib. Any other conventional means of establishing a gauge dimension between center 30 and a reference mounting surface of tool 6 may be used, such as tapering shaft 7. When tool 9 is installed in tool support mounting 28, shoulder 9, or other appropriate reference mounting surface abutts a corresponding and complimentarily-shaped reference mounting surface of tool support mounting 28. This establishes an accurate and repeatable distance between axis B and center 30 of head 8.

Spherical cutting head 8 includes a plurality of cutting teeth 11. (FIGS. 1, 3, 4) Head 8 contacts workpiece 30 within a cutting band 13, illustrated in FIG. 5 as extending approximately 30° either side of the equator of head 8 as defined by a plane perpendicular to shaft 7 and passing through center 30. It is well known in the industry that ball nose mills such as illustrated in FIG. 5 are most accurate at the equator and in adjacent areas. It is therefore desirable to contact workpiece 16 within a cutting band close to the equator. The cutting band should be wide enough so as not to produce premature wear of the tool. The exact location, with and distribution of cutting band 13 depends upon the specific geometry of lens generating apparatus 2.

Although tool 6 is illustrated as a ball nose mill, such as model 43750020 available from M. A. Ford Manufacturing Company, Inc. of Davenport, Iowa, a spherical grinding head of identical dimensions may be used to grind glass workpieces in the same fashion based on the same criteria as that used for cutting polycarbonate and CR39 TM workpieces.

To generate a finished lens from a lens blank which needs only be polished to an optically clear surface, several passes by tool 6 may be required. In general, several rough cuts are made by sequential passes of tool 6 across workpiece 16. In the preferred embodiment, these initial rough cuts are made with a lead of 0.200 inches (i.e. tool 6 moves radially 0.200 inches for each rotation of workpiece 16), and are cut to a depth of 0.030 inches. It is noted that a cut deeper than 0.040 inches would require additional horsepower from tool spindle motor 4. The initial rough spiral cut on workpiece 16 begins at the outer circumference of workpiece 16 and spirals inwardly to the center. Once the center has been reached, a subsequent rough cut is made starting at the center and spiraling radially outward. By starting the subsequent rough cut at the center, cycle time is reduced by eliminating any repositioning of tool 6 and workpiece 16 so as to again start at the outer perimeter of workpiece 16.

A typical lens may undergo 3 to 7 rough cuts, depending upon the prescription being cut. In the preferred embodiment, at the conclusion of the rough cuts, tool 6 is located at the center of workpiece 16, dictating an odd number of rough cuts. An intermediate cut is then made, spiraling outwardly with a lead of 0.100 inches, and a maximum depth no greater than 0.020 inches. A finish cut is made after the intermediate cut, beginning at the outer edge and spiraling inwardly. The finished cut is made at a lead of 0.030 inches, and a maximum depth of 0.015 inches. The finish cut preferably begins at the outer edge and spirals inwardly because, based on the dynamics of the system, it is easier to exit from the center than to enter at the center.

Of course, a different number of rough cuts with different leads may be used, as well as different intermediate and final cuts. The sequence and method of rough cuts, intermediate cuts and final cuts of the preferred embodiment were selected to produce a surface acceptable for polishing with as short a cycle time as possible.

Figure 10:
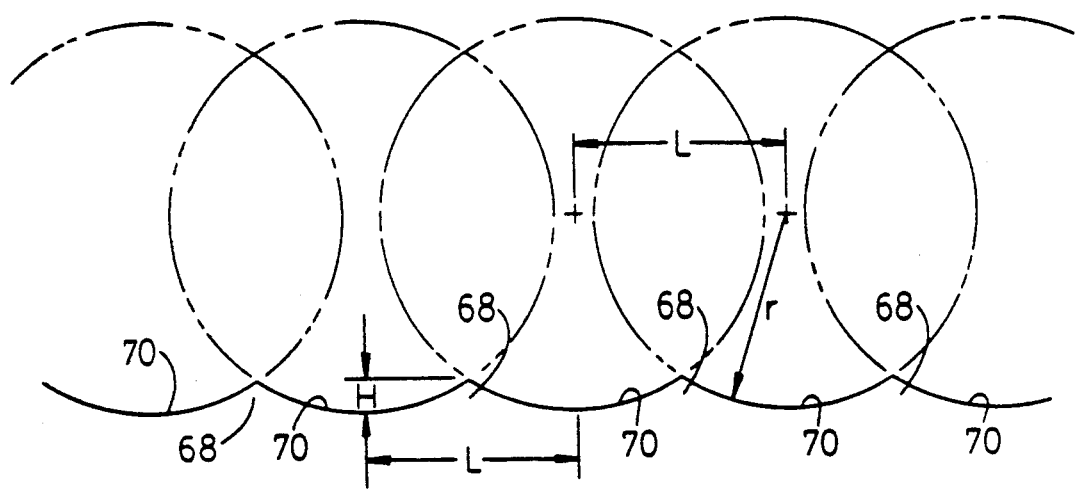
FIG. 10 is an enlarged fragmentary view of a cross-section taken along line 10—10 of FIG. 6 showing the peaks between the tool paths.

FIG. 10 diagrammatically illustrates the affect of lead L on the height H of peaks 68 located between center 70 of the tool path. The circular dashed lines represent spherical cutting head 8 having radius R. As can be seen, the height H of peaks 68 is dependent upon lead L and radius R. For a given head radius, height H is affected only by the lead. Thus, by minimizing the lead, height H will also be minimized. However, as previously mentioned, lead must be selected in view of the desired cycle time as well as to maintain a sufficient chip load on each tooth. Too small of a lead may reduced the chip load to the point at which head 8 may burn the surface. In the preferred embodiment, wherein spherical cutting head 8 has a radius of 0.375 inches, and the final cut has a lead of 0.030 inches, height H is 0.0003 inches, sufficiently small to be polished to an optically clear finish.

Motors 4, 12, 14 and 20 are controlled by a computer controller 66 (FIGS. 3 and 4). In the preferred embodiment, computer 66 is a PMC model 400, manufactured by PMC of Cincinnati, Ohio. To operate lens generating apparatus 2, the system calibrates itself when first turned on by determining the home positions of motors 12, 14 and 20. Because the resolvers are incremental devices, once the home position of motors 12 and 20 have been determined, the resolvers are reset to zero by the computer. FIG. 4 illustrates the home positions of axes T and C as determined by switches 62 and 64, respectively. Switches 62 and 64 are fixed to base 22, and are tripped whenever trips 62a and 64a, which rotate with motor flanges 32 and 46, respectively, rotate past respective switches 62 and 64, so as to generate a home pulse for each respective motor. It is not, however, necessary that the actual home position of axes T and C be paralleled to each other as shown. The parallel orientation of axes T and C as illustrated in FIG. 4 was selected for ease of mounting tool 6 and workpiece 16 to their respective mounts. If the actual home positions are not as shown, computer 66 may be programmed to orient axes T and C in the parallel positions illustrated once the home positions have been determined.

Because cutting heads and grinding heads wear, it is periodically necessary to generate a calibration surface to monitor the wear of each head, and to adapt lens generating apparatus 2 to compensate for that wear. Usually, each morning a calibration surface will be cut with each cutting or grinding tool prior to using lens generating apparatus 2 to manufacture any desired lenses. After each calibration surface has been cut, it is checked and the resulting measurements are inputted into computer control 66 which automatically adjusts for the head wear indicated by the measurements of the calibration surface.

After the head has been calibrated for the day, precision surfaces may be created. The desired prescription is fed into computer control 66, and converted thereby to a format which is useable to control the respective axes. Computer 66 may be programmed to indicate to the user what lens blank should be used to cut the desired prescription. The appropriate lens blank is selected, blocked and mounted to workpiece mounting 42. The lens blank may include a bar code located about its circumferential surface, which may be scanned by bar code scanner 72 (FIG. 3) when axis C is oriented as shown in FIG. 4, to ensure that the user has mounted the proper lens blank. Computer control 66 then controls the axes of lens generating apparatus 2 in the manner described above to generate the desired surface on workpiece 16. When the surface is complete, axes T and C are returned to the positions shown in FIG. 4.

In summary, numerous benefits have been described which result from employing the concepts of the invention. The lens generating apparatus generates a precise surface without elliptical error. The apparatus can generate a wide range of various surfaces polycarbonate, CR39 TM and glass lens blanks may be cut or ground on the apparatus. The apparatus achieves this without the use of expensive and sensitive linear way systems. The apparatus does not require adjustment or alignment for each surface generated, nor does it require extensive calibration. The apparatus may be operated without extensive training or skill.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An apparatus for generating a surface on a lens blank during an automated grinding operation, said apparatus comprising:
   (a) a base;
   (b) a lens blank support spindle rotatable about a first rotational axis;
   (c) a lens blank mounting disposed on a longitudinal end portion of the lens blank support spindle and moveable therewith for securing a lens blank;
   (d) means for rotating the lens blank mounting and the lens blank support spindle relative to said base about said first rotational axis;
   (e) means for rotating the lens blank support spindle relative to the base about a second rotational axis which is non-coincident to said first axis;
   (f) a tool spindle rotatable about a third rotational axis which is non-coincident to said second rotational axis;
   (g) a tool support mounting disposed on a longitudinal end portion of the tool spindle and moveable therewith for securing a surface generating tool;
   (h) means for rotating the tool and tool spindle about said third rotational axis;
   (i) means for rotating the tool spindle relative to the base about a fourth rotational axis which is non-coincident to said first, second and third rotational axes; and
   (j) computer controlled means for controlling the orientation of said first and third rotational axes with respect to said base wherein the computer controlled means operates by having variations in the rotational angular position of a portion of the apparatus that rotates around the first rotational axis control the velocity of rotation of the first axis about the second axis and the velocity of rotation of the third axis about the fourth axis;
   wherein the lens blank and tool are juxtaposed and controllable by the computer controlled means so as to be capable of forming a lens surface without linear motion of the lens blank or tool during the grinding operation; and
   wherein at least part of said apparatus is rotatable on each of said four axes during grinding.

2. An apparatus for generating a surface on a lens blank during an automated grinding operation, said apparatus comprising:
   (a) a base;
   (b) first means for rotating a surface generating tool about a first axis relative to said base;
   (c) second means for rotating said first axis about a second axis relative to said base, said second axis being non-coincident with said first axis;
   (d) third means for rotating a lens blank about a third axis with respect to said base, said third axis being non-coincident with said second axis;
   (e) fourth means for rotating said third axis about a fourth axis with respect to said base, said fourth axis being non-coincident with said third axis; and
   (f) computer controlled means for controlling the orientation of said first and third axes with respect to said base wherein the computer controlled means operates by having variations in the rotational angular position of a portion of the apparatus that rotates around the third axis control the velocity of rotation of the third axis about the fourth axis and the velocity of rotation of the first axis about the second axis;
   wherein the lens blank and tool are juxtaposed and controllable by the computer controlled means so as to be capable of forming a lens surface without linear motion of the lens blank or tool during the grinding operation; and
   wherein at least part of said apparatus is rotatable on each of said four axes during grinding.

3. The apparatus of claim 1, wherein the second rotational axis is located on a lens blank support spindle side of the lens blank mounting.

* * * * *